United States Patent
Yuto et al.

(10) Patent No.: US 9,740,087 B2
(45) Date of Patent: Aug. 22, 2017

(54) LIGHT SOURCE DEVICE UNIT, LIGHT SOURCE CARTRIDGE, AND PROJECTOR

(71) Applicant: Seiko Epson Corporation, Tokyo (JP)

(72) Inventors: Daiki Yuto, Matsumoto (JP); Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/176,219

(22) Filed: Jun. 8, 2016

(65) Prior Publication Data
US 2016/0363849 A1 Dec. 15, 2016

(30) Foreign Application Priority Data
Jun. 11, 2015 (JP) ................................. 2015-118094

(51) Int. Cl.
*G03B 21/16* (2006.01)
*G03B 21/20* (2006.01)
*G03B 21/14* (2006.01)

(52) U.S. Cl.
CPC ........... *G03B 21/16* (2013.01); *G03B 21/145* (2013.01); *G03B 21/2013* (2013.01); *G03B 21/2066* (2013.01)

(58) Field of Classification Search
CPC ........ G03B 21/14; G03B 21/20; G03B 21/00; G03B 21/16; H04N 9/31; F21S 2/00
See application file for complete search history.

(56) References Cited

U.S. PATENT DOCUMENTS

| 2010/0026966 A1 | 2/2010 | Nakano |
| 2011/0299046 A1 | 12/2011 | Maehara et al. |
| 2013/0314673 A1* | 11/2013 | Tateno .................. G03B 21/16 353/57 |

FOREIGN PATENT DOCUMENTS

| JP | 2010-38976 A | 2/2010 |
| JP | 2011-253156 A | 12/2011 |
| JP | 2013-246183 A | 12/2013 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A light source device unit includes a light source device including a light source and an outflow port constituting part having a plurality of first outflow ports for making a cooling air flow out, a flow channel constituting part including an inlet port constituting part having a plurality of first inlet ports communicated with the first outflow ports and adapted to introduce the cooling air, and an opening and closing part adapted to selectively open and close the first inlet ports, the first inlet ports are arranged in a periphery of a central axis (a stationary shaft), and the opening and closing part includes a rotary member rotates around the stationary shaft in accordance with a posture of the light source device to thereby selectively open and close the first inlet ports.

9 Claims, 9 Drawing Sheets

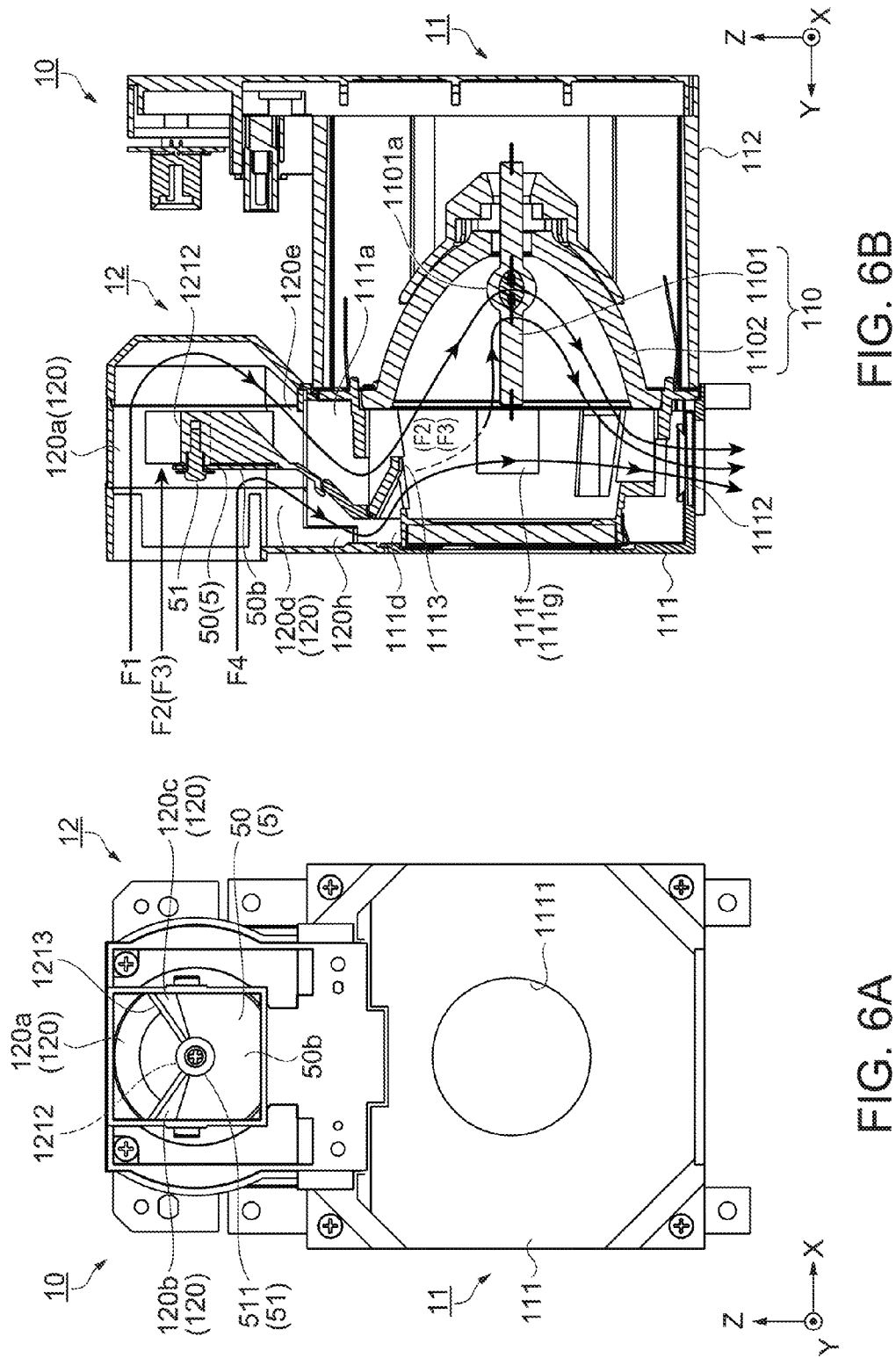

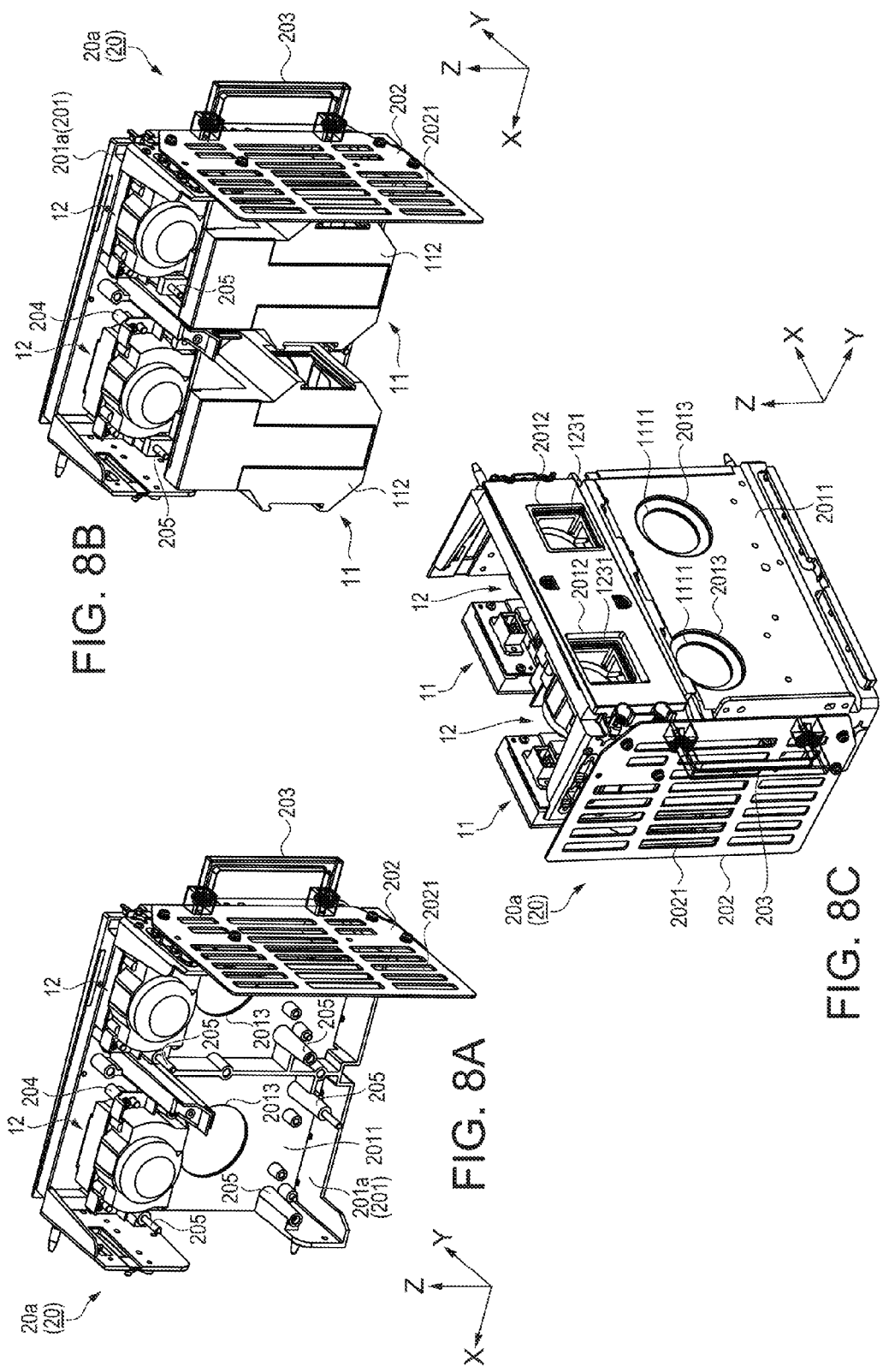

LIGHT SOURCE DEVICE UNIT, LIGHT SOURCE CARTRIDGE, AND PROJECTOR

CROSS REFERENCE TO RELATED APPLICATION

The entire disclosure of Japanese Patent Application No. 2015-118094 filed Jun. 11, 2015 is expressly incorporated by reference herein.

BACKGROUND

1. Technical Field

The present invention relates to a light source device unit, a light source cartridge, and a projector.

2. Related Art

In the past, there has been known a projector, which modulates light (emitted light) emitted from a light source in accordance with image information using a light modulation device, and then projects the light thus modulated in an enlarged manner using a projection optical device. In recent years, projectors have become to be often used in events or the like, and an increase in luminance of projectors has made further progress. It should be noted that in the cases of making the projector high in luminance, two or more light sources (e.g., two or more discharge lamps) are used in some of the cases. Further, regarding the mounting posture of the projector when performing projection, there has been performed projection in other mounting postures than desktop mounting or ceiling mounting (or similar mounting) as normal mounting postures in recent years.

In JP-A-2013-246183, there is disclosed the fact that in order to cool the light source (lamp) generating heat, a plurality of inlet ports for introducing cooling air is disposed in the periphery of a central axis in parallel, and an opening and closing device rotates around the central axis in accordance with the posture of the light source device to thereby selectively open and close the inlet ports. It is described that according to this configuration, it is possible to introduce the cooling air into the appropriate inlet port, and even in the case in which the posture of the light source device has been changed, the light source can stably be cooled.

A reflective high-pressure mercury lamp generally used as the light source of the projector is configured including a light emitting tube and a reflector. Further, the temperature of the light emitting tube significantly affects its life, and is dramatically varied due to the mounting posture (the posture of the light source) of the projector. For example, the temperature of the light emitting tube varies dramatically between the normal mounting postures described above and other mounting postures. Therefore, it arises as a problem to be solved to appropriately cool the light source in accordance with the mounting posture of the projector.

Therefore, there has been demanded a light source device unit capable of performing appropriate cooling in accordance with the mounting posture (the posture of the light source device) of the projector. Further, there have been demanded a light source cartridge using the light source device unit, and a projector using the light source cartridge.

SUMMARY

An advantage of some aspects of the invention is to solve at least a part of the problems described above, and the invention can be implemented as following forms or application examples.

Application Example 1

A light source device unit according to this application example includes a light source device including a light source having a light emitting tube and a reflector adapted to reflect a light beam emitted from the light emitting tube, and a outflow port constituting part adapted to house the light source and having a plurality of first outflow ports adapted to make a cooling air flow out toward the light emitting tube, and a flow channel constituting part including an inlet port constituting part having a plurality of first inlet ports communicated with the plurality of first outflow ports and adapted to introduce the cooling air, and an opening and closing part adapted to selectively open and close the first inlet ports, the first inlet ports are arranged in a periphery of a predetermined central axis, and the opening and closing part includes a rotary member rotates around the central axis in accordance with a posture of the light source device to thereby selectively open and close the first inlet ports.

In such a light source device unit, the light source device unit is configured including the light source device and the flow channel constituting part. The light source device is provided with the light source having the light emitting tube and the reflector, and the outflow port constituting part housing the light source and having the first outflow ports. The flow channel constituting part is provided with the inlet port constituting part including first inlet ports, and the opening and closing part for selectively opening and closing the first inlet ports. Due to this configuration, the cooling air is introduced from the first inlet ports opened by the opening and closing part, and flows out from the first outflow ports communicated with the first inlet ports toward the light emitting tube. Thus, the cooling air can be fed to the light emitting tube. Further, since the opening and closing part rotates around the central axis in accordance with the posture of the light source device to thereby select (open) the first inlet ports from which the cooling air is introduced, it is possible to introduce the cooling air into the first inlet ports opened in accordance with the posture of the light source device, and then make the cooling air flow out from the first outflow ports. Therefore, according to the light source device unit, it becomes possible to switch the flow channels (the first inlet ports) of the flow channel constituting part in accordance with the posture of the light source device, and it is possible to perform appropriate cooling in accordance with the posture of the light source device.

Application Example 2

In the light source device unit according to the application example, it is preferable that the rotary member rotates under weight of the rotary member to thereby selectively open and close the first inlet ports.

According to such a light source device unit, since the rotary member rotates under its own weight, it is unnecessary to provide a drive section for driving the rotary member, a control section for controlling the drive section or the like, and it becomes possible to selectively open and close the first inlet ports with a simple structure.

Application Example 3

In the light source device unit according to the application example, it is preferable that the rotary member is formed to have a shape obtained by connecting the central axis and both ends of a circular arc centered on the central axis.

According to such a light source device unit, by forming the rotary member to have the shape described above, the structure of selectively opening and closing the inlet ports can easily be configured.

Application Example 4

In the light source device unit according to the application example, it is preferable that a surface, against which the cooling air blows, of the rotary member is formed to have one of a shape perpendicular to the central axis and a shape tilted with respect to the central axis.

According to such a light source device unit, since the surface against which the cooling air blows of the rotary member is configured including the shape perpendicular to the central axis, or the shape tilted with respect to the central axis, it becomes possible for the rotary member to control the amount of cooling air to be introduced into the first inlet ports opened besides an action of selectively opening and closing the first inlet ports located on the posterior side of the rotary member. The same applies to, for example, the case in which the second inlet port is disposed on the anterior side of the rotary member. According to this configuration, it becomes possible to perform further appropriate cooling, efficient cooling in accordance with the posture of the light source device.

Application Example 5

In the light source device unit according to the application example, it is preferable that the flow channel constituting part includes a second inlet port into which the cooling air is introduced in a direction roughly perpendicular to the central axis on an anterior side of a flow channel of the cooling air with respect to the rotary member, and the outflow port constituting part of the light source device includes a second outflow port communicated with the second inlet port.

According to such a light source device unit, the second inlet port is disposed on the anterior side of the flow channel of the cooling air of the rotary member with respect to the first inlet ports disposed on the posterior side of the flow channel of the cooling air of the rotary member. In addition, the outflow port constituting part is provided with the second outflow port communicated with the second inlet port. Due to the second inlet port disposed on the anterior side of the flow channel of the cooling air with respect to the rotary member, it is possible to make it easy to make the cooling air flow to a region (e.g., a welded part on the anterior side of the light emitting tube) on the anterior side of the light emitting tube, for example, to which the cooling air is difficult to flow from the first inlet ports disposed on the posterior side. Further, since the second inlet port located on the anterior side introduces the cooling air in the direction roughly perpendicular to the central axis, the area in the planar view of the periphery of the rotary member can be reduced compared to, for example, the structure provided with an inlet port for introducing the cooling air roughly in parallel to the central axis, and thus, the periphery of the rotary member can be miniaturized.

Application Example 6

A light source cartridge according to this application example includes anyone of the light source device units described above, and a cartridge case including a light source device housing part adapted to detachably house the light source device of the light source device unit, and an inlet port fixation part adapted to fix the inlet port constituting part of the light source device unit, and adapted to make the first inlet ports respectively communicate with the first outflow ports in a case in which the light source device is installed in the light source device housing part.

According to such a light source cartridge, the light source cartridge is configured including the light source device unit and the cartridge case. Further, in the case of, for example, replacing the light source device, by detaching an old light source device and then mounting a new light source device using the cartridge case as the base, it is possible to easily make the first outflow ports of the light source device communicate with the first inlet ports of the inlet port constituting part fixed to the cartridge case. Therefore, it is possible to easily perform the replacement of the light source device in the light source cartridge.

Application Example 7

In the light source cartridge according to the application example, it is preferable that in the cartridge case, a plurality of the light source devices is mounted, and the inlet port constituting part is disposed corresponding to each of the light source devices.

According to such a light source cartridge, since the plurality of light source devices is mounted, a high-luminance light source can be achieved. Further, when replacing the light source device, since the light source cartridge in which the plurality of light source devices is mounted is detached from the projector, and then each of the light source devices can be replaced, handling as the light source becomes easy compared to the case in which the plurality of light source device units is individually mounted in the projector.

Further, since the inlet port constituting part is disposed corresponding to each of the light source devices, connection to the inlet port constituting part can be achieved only by replacing the light source device. Therefore, there is no need to make the first inlet ports and the first outflow ports communicate with each other, and thus, the replaceability of the light source device is improved.

Further, by mounting the inlet port constituting parts corresponding respectively to the light source devices, cooling of the light source device can appropriately be performed in accordance with the posture (the posture of the light source cartridge) of the light source device.

Application Example 8

In the light source cartridge according to the application example, it is preferable that the flow channel constituting part is configured without including the opening and closing part.

According to such a light source cartridge, since the opening and closing part is not included, the cooling air can be introduced into the first inlet ports without selectively opening or closing the first inlet ports. Therefore, it becomes possible to more flexibly deal with the posture of the light source device, and cooling of the light source device can appropriately be performed.

Application Example 9

A projector according to this application example includes anyone of the light source cartridges described above, a light modulation device adapted to modulate a light beam emitted from the light source cartridge in accordance with image information, a projection optical device adapted to project the light beam modulated by the light modulation device, and a cooling fan adapted to feed the cooling air toward the inlet port constituting part.

According to such a projector, since there is provided the light source cartridge capable of appropriately cooling the light source device in accordance with the mounting posture of the projector, it is possible to extend the life of the light source device due to the mounting posture of the projector, and to keep the optical characteristics. Further, by detaching the light source cartridge from the projector, attachment and detachment of the light source device can easily be performed.

Application Example 10

In the projector according to the application example, it is preferable that any one of the light source cartridges provided with the flow channel constituting part with the opening and closing part is provided as a first light source cartridge, any one of the light source cartridges provided with the flow channel constituting part without the opening and closing part is provided as a second light source cartridge, and either one or both of the first light source cartridge and the second light source cartridge be used in accordance with a mounting posture of the projector.

According to such a projector, the projector is configured including the first light source cartridge provided with the flow channel constituting part with the opening and closing part, and the second light source cartridge provided with the flow channel constituting part without the opening and closing part. Further, the two types of light source cartridges (the first light source cartridge and the second light source cartridge) are used properly in accordance with the mounting posture of the projector. When using the projector, either one or both of the two types of light source cartridges is used in accordance with the mounting posture. Since there are provided the two types of light source cartridges different in presence or absence of the opening and closing part as described above, it is possible to deal with the mounting postures of the projector, and to appropriately cool the light source device. Further, due to such a light source cartridge, it is possible to use a plurality of light source devices installed in one light source cartridge. Therefore, it is possible to achieve the high-luminance projector and the improvement in flexibility of mounting posture of the projector.

BRIEF DESCRIPTION OF THE DRAWINGS

The invention will be described with reference to the accompanying drawings, wherein like numbers reference like elements.

FIGS. 6A and 6B are diagrams each showing a light source device unit.

FIGS. 8A through 8C are perspective views each showing a light source cartridge.

DESCRIPTION OF AN EXEMPLARY EMBODIMENT

An embodiment of the invention will hereinafter be described with reference to the accompanying drawings.

Embodiment

Figure 1A:
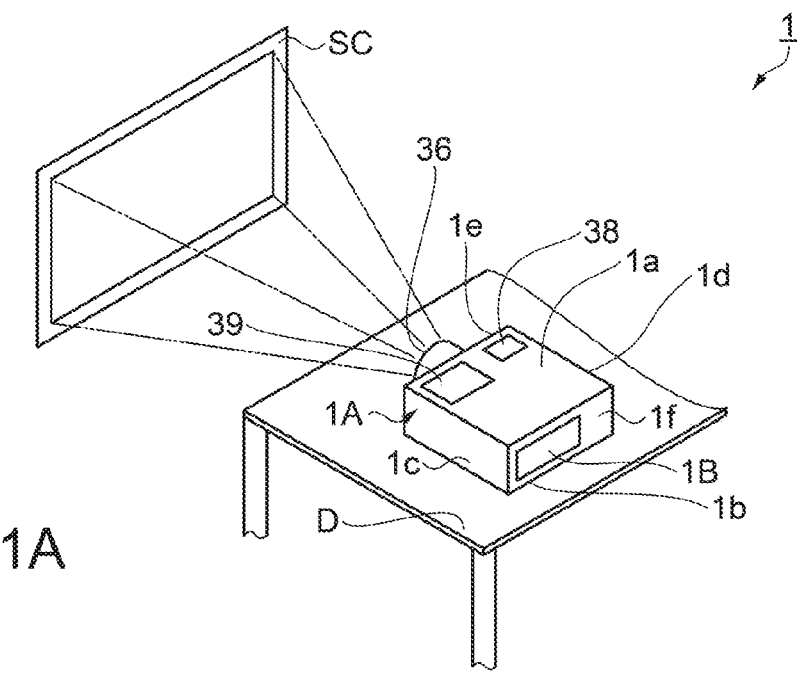
FIGS. 1A and 1B are schematic perspective views each showing a mounting posture of a projector according to an embodiment of the invention when performing projection using the projector.
Figure 1B:
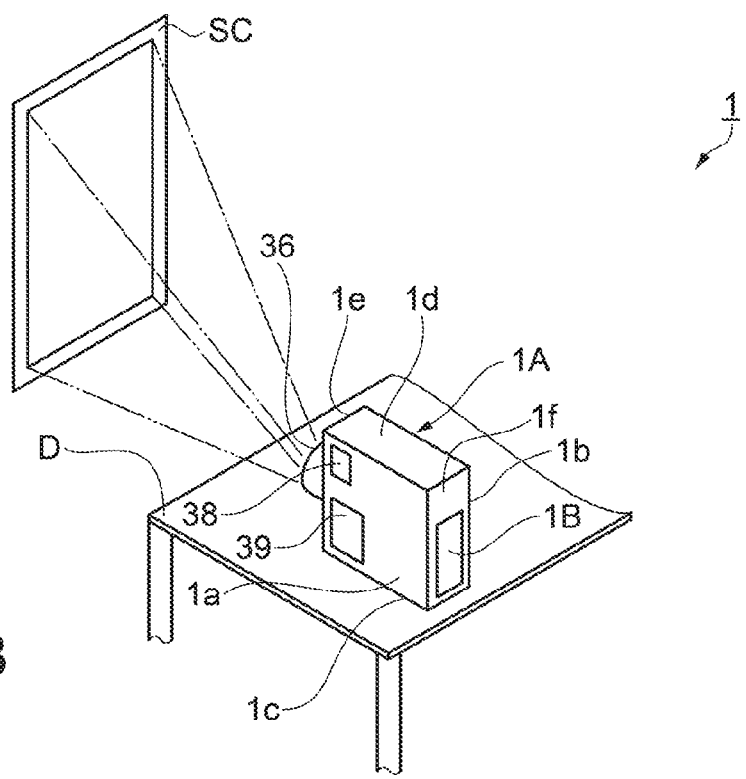

FIGS. 1A and 1B are perspective views each showing a mounting posture of the projector 1 according to the embodiment when performing projection using the projector 1, wherein FIG. 1A shows a normal mounting posture, and FIG. 1B shows a side-surface mounting posture. The mounting posture when performing projection using the projector 1 will be described with reference to FIGS. 1A and 1B.

The projector 1 according to the present embodiment modulates light, which has been emitted from a light source device not shown, in accordance with image information using a light modulation device, and then projects the result on a screen SC or the like in an enlarged manner. In the usages of the projector 1 according to the present embodiment, the projector 1 is made to perform projection in two mounting postures, namely the normal mounting posture shown in FIG. 1A and the side-surface mounting posture shown in FIG. 1B.

As shown in FIGS. 1A and 1B, the projector 1 is formed to have a roughly hexahedral box-like shape. Here, with reference to the case in which the projector 1 is mounted in the normal mounting posture as shown in FIG. 1A, an upper surface with respect to an exterior housing 1A of the projector 1 is denoted by 1a, a lower surface is denoted by 1b, right and left surfaces are denoted by 1c, 1d, a front surface on which a projection optical device 36 is mounted is denoted by 1e, and a back surface is denoted by 1f. Further, the direction in which the projection optical device 36 performs projection is defined as a front direction.

In the present embodiment, the normal mounting posture is defined as a mounting posture in which a projector has typically been mounted in the past as shown in FIG. 1A, and denotes a mounting posture (so-called desktop mounting posture) in which the projector 1 is mounted on a desktop surface D with the lower surface 1b of the projector 1 facing downward to make the projector 1 perform projection, and a mounting posture (so-called ceiling mounting posture) in which the projector 1 is mounted on the ceiling surface (not shown) using a mounting bracket to make the projector 1 perform projection. Further, in the present embodiment, as the normal mounting posture, there is included, for example, a mounting posture of performing projection while being tilted upward or downward defining the state, in which a projection optical axis C2 (FIG. 2) or an optical axis C1 (FIG. 2) is parallel to the desktop surface D, as 0°. Specifically, the tilt angle with which projection can be performed as the normal mounting posture is 180° in each of the upward direction and the downward direction, in other words, in a range of 360°.

Further, the side-surface mounting posture denotes a mounting posture in which the projector 1 is rotated roughly 90° around the projection optical axis C2 (FIG. 2) of the light emitted from the projection optical device 36 with respect to the normal mounting posture as shown in FIG. 1B to thereby dispose, for example, the left surface 1c of the projector 1 on the desktop surface D to make the projector 1 perform projection. Further, in the present embodiment, in the case of performing projection in the normal mounting posture, a landscape image (e.g., an image at an aspect ratio of 4:3) is projected as shown in FIG. 1A, and in the case of performing projection in the side-surface mounting posture, a portrait image (e.g., an image obtained by rotating an image at an aspect ratio of 4:3 as much as 90°) is projected as shown in FIG. 1B.

On the upper surface 1a of the projector 1, there are disposed an input operation section 38 provided with a variety of keys for performing an input operation, a display section 39 or the like for performing display of the operation state and the operation method of the projector 1 to the user, and so on. Further, on the back surface 1f, there is disposed a cover member 1B to be detached and attached when replacing light source cartridges 20, 21 (FIG. 2) described later. Further, although not shown in the drawings, on the right surface 1d, there is provided an input terminal section (not shown) provided with a variety of terminals for inputting an image signal from an external device.

It should be noted that to the exterior housing 1A, there are provided an intake port for taking in the external air not shown, and an exhaust port for discharging the warmed air located inside the exterior housing 1A to the outside, or the like. Further, due to an intake fan (not shown) provided inside the exterior housing 1A, the external air is taken in through the intake port. The external air thus taken in flows through a duct not shown, and then blows against a cooling target heated to a high temperature to thereby perform cooling. It should be noted that the air warmed by performing cooling is discharged to the outside of the exterior housing 1A via the exhaust port by a discharge fan not shown.

Figure 2:
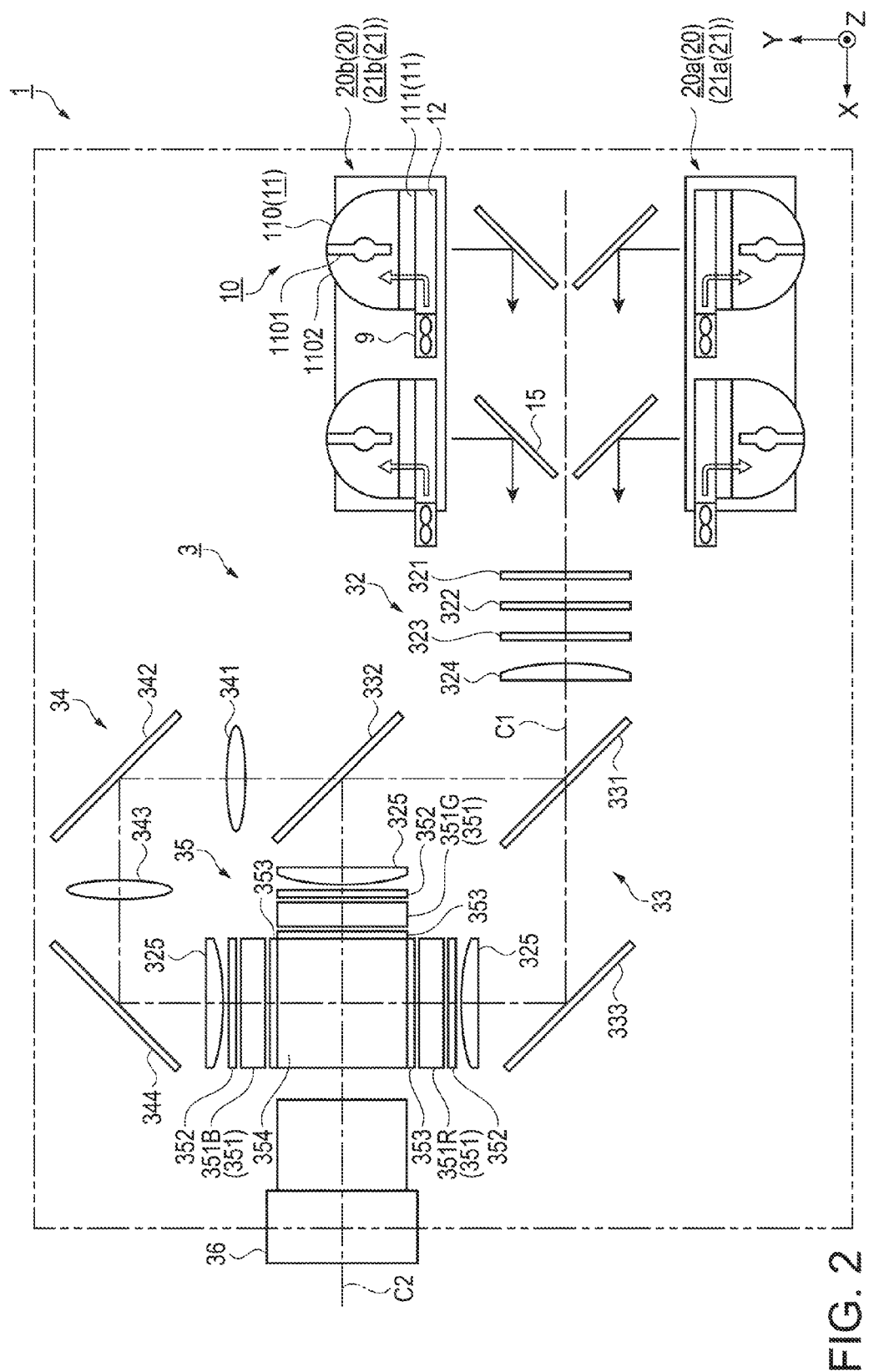
FIG. 2 is a diagram schematically showing an optical unit of the projector.

FIG. 2 is a diagram schematically showing an optical unit 3 of the projector 1. Further, FIG. 2 schematically shows a configuration of the projector 1 viewed from above in the state in which the projector 1 is mounted in the normal mounting posture. The configuration and the operation of the optical unit 3 of the projector 1 will be described with reference to FIG. 2.

The optical unit 3 is a device operating based on the control by a control section (not shown) to form image light in accordance with image information. In the present embodiment, the optical unit 3 is provided with light source devices 11 each including a light source 110 as shown in FIG. 2. Further, the light source devices 11 are configured so as to be built into the light source cartridge 20, 21. It should be noted that the light source 110 is provided with a light emitting tube 1101, and a reflector 1102 for reflecting a light beam generated and then emitted by the light emitting tube 1101 to a uniform direction.

Further, the optical unit 3 is provided with an illumination optical device 32 having lens arrays 321, 322, a polarization conversion element 323, an overlapping lens 324, and collimating lenses 325. Further, the optical unit 3 is provided with a color separation optical device 33 having dichroic mirrors 331, 332, and a reflecting mirror 333. Further, the optical unit 3 is provided with a relay optical device 34 having an incident side lens 341, a relay lens 343, and reflecting mirrors 342, 344.

Further, the optical unit 3 is provided with an electro-optic device 35 having three liquid crystal panels 351 (a liquid crystal panel for the red light (R light) is denoted by 351R, a liquid crystal panel for the green light (G light) is denoted by 351G, and a liquid crystal panel for the blue light (B light) is denoted by 351B) as the light modulation device, three incident side polarization plates 352, three exit side polarization plates 353, and a cross dichroic prism 354 as a color combining optical device. Further, the optical unit 3 is provided with a projection optical device 36 and an optical component housing (not shown) for housing the optical devices 32 through 36.

The optical unit 3 separates light beams having been emitted from the light source devices 11 and then passed through the illumination optical device 32 into three colored light beams, namely the R light, the G light, and the B light, with the color separation optical device 33 due to the configuration described above. Further, the colored light beams thus obtained by the separation are modulated by the respective liquid crystal panels 351 in accordance with the image information, and are formed as modulated light beams of the respective colored light beams. The modulated light beams of the respective colored light beams enter the cross dichroic prism 354 to be combined with each other as the image light, and are projected on the screen SC (FIGS. 1A and 1B) or the like via the projection optical device 36 in an enlarged manner. It should be noted that the optical devices 32 through 36 described above are used as a variety of general optical systems of the projector, and therefore, a specific description regarding the optical devices 32 through 36 will be omitted.

Hereinafter, for the sake of convenience of explanation, the description will be presented defining a direction in which the light beam is emitted from the projection optical device 36 as a +X direction (frontward), a rightward direction horizontally perpendicular to the X axis viewed along the +X direction as a +Y direction (rightward), an upward direction perpendicular to the +X direction and the +Y direction as a +Z direction (upward).

The projector 1 according to the present embodiment is configured as an optical system using four light sources 110. By using the four light sources 110, it is achieved to make the projector 1 high in luminance. As the light source 110, there is used a discharge lamp in the present embodiment, more specifically, a super-high pressure mercury lamp, a metal halide lamp, or the like. Further, the four light sources 110 are arranged two by two in the horizontal direction so as to be opposed to each other centered on respective reflecting mirrors 15. It should be noted that in the case in which the four light sources 110 light, the light beams are reflected by the respective reflecting mirrors 15, and the light beams, which have been reflected to be uniformed in direction, enter the illumination optical device 32.

It should be noted that the four light sources 110 all have the same specification irrespective of the mounting posture of the projector 1. Each of the light sources 110 is housed in an outflow port constituting part 111 described later to constitute the single light source device 11. Therefore, in the present embodiment, there is adopted a configuration using the four light source devices 11. Further, the four light source devices 11 all have the same specification irrespective of the mounting posture of the projector 1.

Out of the four light source devices 11, the two light source devices 11 disposed along the X direction are housed in a cartridge case described later to constitute a light source cartridge corresponding to the mounting posture. In the present embodiment, as the reference symbol of the light source cartridge, the light source cartridge to be made to correspond to the normal mounting posture is denoted by the reference symbol 20, and the light source cartridge to be made to correspond to the side-surface mounting posture is denoted by the reference symbol 21. Therefore, in the present embodiment, the light source cartridge 20 is used for the normal mounting posture, and the light source cartridge 21 is used for the side-surface mounting posture.

Further, in the present embodiment, as shown in FIGS. 1A and 2, in the case of using the normal mounting posture as a reference, since there is provided a configuration in which the light source cartridges are disposed in a horizontal direction, for example, the light source cartridge 20 for the right side and the light source cartridge 20 for the left side are configured for the light source cartridge 20 for the normal mounting posture. Specifically, as the reference symbols of the light source cartridge 20, the light source cartridge for the left side is denoted by the reference symbol 20a, and the light source cartridge for the right side is denoted by the reference symbol 20b.

Therefore, in the case of using the projector 1 in the normal mounting posture, it is required in the present embodiment to dispose the light source cartridge 20a for the left side on the left side, and the light source cartridge 20b for the right side on the right side, respectively, among the light source cartridges 20 for the normal mounting posture. Then, the projector 1 is set in the normal mounting posture (the posture in which the lower surface 1b is disposed on the desktop surface D).

Similarly, in the case of using the projector 1 in the side-surface mounting posture, it is required in the present embodiment to dispose alight source cartridge 21a for the left side on the left side, and a light source cartridge 21b for the right side on the right side, respectively, among the light source cartridges 21 for the side-surface mounting posture. Then, the projector 1 is set in the side-surface mounting posture (the posture in which the left surface 1c is disposed on the desktop surface D) as shown in FIG. 1B. In the case of setting the projector 1 in the side-surface mounting posture, since the left surface 1c is disposed on the desktop surface D, there occurs the case in which the light source cartridge 21a for the left side is disposed on the lower side, and the light source cartridge 21b for the right side is disposed on the upper side.

It should be noted that in the present embodiment, in the case in which the light source cartridges 20, 21 for the different mounting postures are disposed in the respective sides in the horizontal direction such as the case in which the light source cartridge 20a for the normal mounting posture is disposed on the left side, and the light source cartridge 21b for the side-surface mounting posture is disposed on the right side, it is possible to selectively light one of the light source cartridges 20, 21 corresponding to the mounting posture of the projector 1. In this case, since it results that the two light source devices 11 are used, the luminance of the projector 1 decrease by half.

In the present embodiment, inside the exterior housing 1A, there is formed a cartridge housing part (not shown) for housing the light source cartridges 20, 21. The cartridge housing part is provided with four cooling fans 9. The cooling fans 9 are disposed so as to correspond one-to-one to the light source devices 11 in the case in which the light source cartridges 20, 21 are housed in the cartridge housing part to achieve a configuration of respectively cooling the light emitting tubes 1101 of the light source devices 11 generating heat. It should be noted that the details of the light source devices 11 and the light source cartridges 20 will be described later.

Figure 3A:
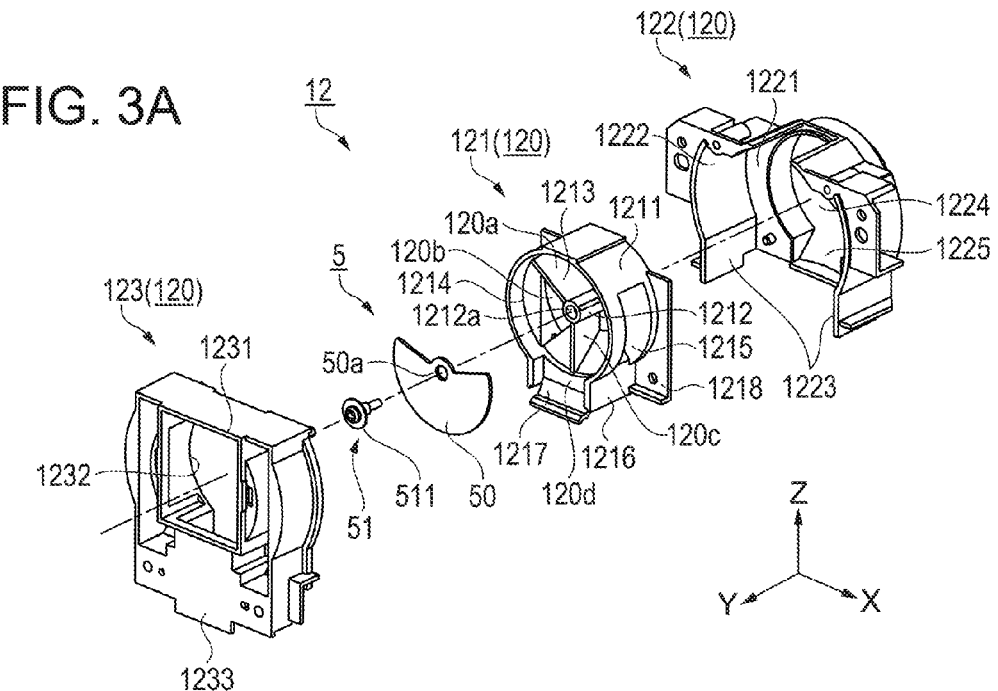
FIGS. 3A and 3B are each an exploded view of a flow channel constituting part.
Figure 3B:
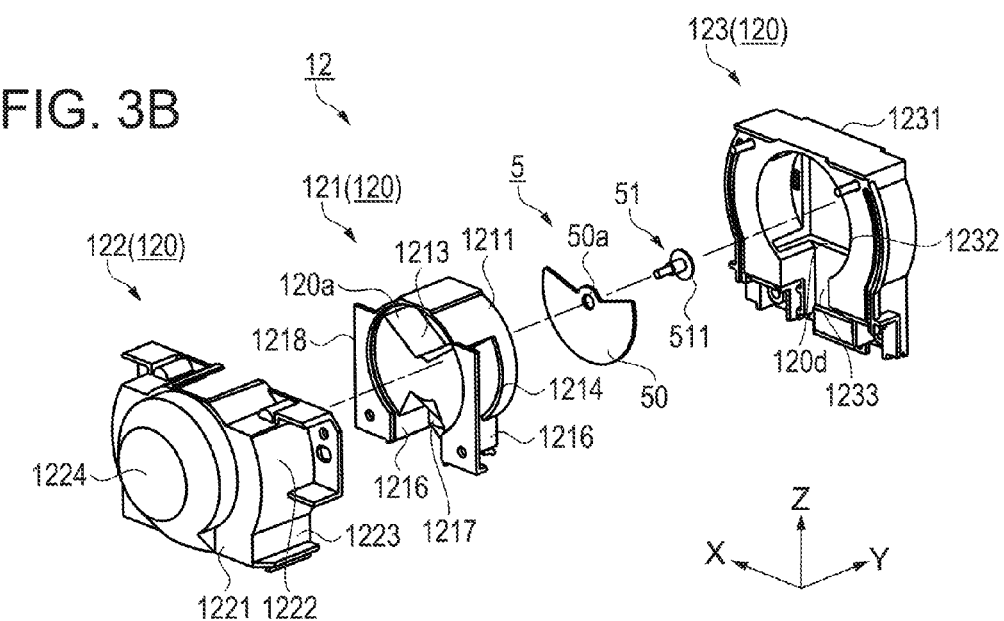

FIGS. 3A and 3B are exploded views of the flow channel constituting part 12, wherein FIG. 3A is an exploded view viewed from the side from which the cooling air is introduced into the flow channel constituting part 12, and FIG. 3B is an exploded view viewed from the opposite direction to that in FIG. 3A. It should be noted that as the flow channel constituting part 12 shown in FIG. 3A, there is cited the flow channel constituting part 12 provided to the light source device unit 10 used in the light source cartridge 20a for the left side among the light source cartridges 20 for the normal mounting posture for the sake of convenience of explanation.

An inlet port constituting part 120 of the flow channel constituting part 12 is constituted by a first constituting part 121, a second constituting part 122, and a third constituting part 123. The first constituting part 121 is a member for forming first inlet ports 120a, 120b, and 120c, and a second inlet port 120d, and rotatably fixing an opening and closing part 5. The first constituting part 121 is provided with a main body 1211 having a cylindrical shape, a stationary shaft 1212 formed on the central axis of the main body 1211, and the first inlet ports 120a, 120b, and 120c obtained by separation into three equal parts with three wall parts 1213 radially extending in three directions from a side surface of the stationary shaft 1212 and connected to an inner periphery of the main body 1211. The separation with the wall parts 1213 is performed at intervals of about 120° in the present embodiment with reference to the wall part 1213 extending in the −Z direction from the stationary shaft 1212. In other words, the first inlet ports 120a, 120b, and 120c are disposed in parallel to and in the periphery of the stationary shaft 1212 as a predetermined central axis.

The first inlet port 120a has an opening on the −Y direction side. Further, the first inlet port 120b is closed on the −Y direction side, and is provided with an opening part 1214 on a side surface (the −X side) of the main body 1211. The first inlet port 120c is closed on the −Y direction side, and is provided with an opening part 1215 on the side surface (the +X side) of the main body 1215 similarly to the first inlet port 120b.

Further, in a lower area of the side surface of the main body 1211 having a cylindrical shape, there are provided two extending parts 1216 each extending along the −Z direction along the Y direction. Further, in a lower area of the side surface of the main body 1211, there is provided an extending part 1217 extending in the −Z direction along the X direction at a position located one step inner from the end parts in the +Y direction of the extending parts 1216 so as to connect the two extending parts 1216. It should be noted that the extending part 1217 has a shape bending toward the +Y direction as the distance from the tip part of the extension decreases.

Further, the first constituting part 121 is provided with a base part 1218 extending in the X direction from the end part on the −Y direction side of the main body 1211, and having contact with the second constituting part 122 when fixing the first constituting part 121 to the second constituting part 122. It should be noted that the first constituting part 121 is constituted to have a symmetrical shape about the Y-Z plane passing through the stationary shaft 1212.

The opening and closing part 5 is provided with a rotary member 50 and a restricting screw 51. The rotary member 50 is formed of a plate-like member, and is formed to have a shape obtained by connecting the stationary shaft 1212 as the central axis and both ends of a circular arc centered on the stationary shaft 1212, in general, in a planar view. It should be noted that the outer peripheral part of the rotary member 50 has a diameter roughly the same as the outer shapes of the first inlet ports 120a, 120b, and 120c.

The rotary member 50 is rotatably supported centered on the restricting screw 51 (the stationary shaft 1212) by inserting the restricting screw 51 into a rotational center hole 50a and then screwing the restricting screw 51 to the screw hole 1212a formed on the stationary shaft 1212. Then, the rotary member 50 has the center of gravity eccentrically located with respect to the rotational center hole 50a, and therefore, rotates under its own weight so as to be located vertically below the stationary shaft 1212. Further, the rotary member 50 is restricted by a flange 511 of the restricting screw 51 so as not to be disengaged from the stationary shaft 1212.

The second constituting part 122 houses the first constituting part 121 inside. The second constituting part 122 is provided with an abutting part 1221 formed to have a planar shape in order to make the base part 1218 of the first constituting part 121 abut on the abutting part 1221. It should be noted that on both sides in the X direction, there are formed wall parts 1222 each formed of a curved surface extending in the +Y direction so as to surround the abutting part 1221, and keep a certain gap from the outer periphery of the main body 1211 of the first constituting part 121.

The second constituting part 122 is provided with two extending parts 1223 extending in the −Z direction from the lower end parts of the wall parts 1222, respectively. Further, the second constituting part 122 is provided with a recessed part 1224, which is recessed one step from the abutting part 1221 in the −Y direction with a diameter coinciding with the outer shape of the main body 1211 of the first constituting part 121, and is further formed to have a curved shape. Further, the second constituting part 122 is provided with a tilted part 1225 obliquely connected to the abutting part 1221 from the lower side of the recessed part 1224. It should be noted that the second constituting part 122 is formed to have a symmetrical shape about the Y-Z plane passing through the stationary shaft 1212 of the first constituting part 121.

As shown in FIGS. 3A and 3B, the third constituting part 123 is formed to have a rectangular box-like shape. On the +Y side of the upper part, there is formed a first opening part 1231 having a rectangular shape, and an end part of a duct (not shown) for making the cooling air fed from the cooling fan 9 flow is connected to the first opening part 1231 from the +Y direction side. The cooling air having flown through the duct is introduced into the flow channel constituting part 12 from the first opening part 1231.

On the −Y side of the first opening part 1231, there is formed a second opening part 1232 formed to have a diameter roughly the same as the outer shape of the main body 1211 having the cylindrical shape of the first constituting part 121. Further, a space between the second opening part 1232 and the outer shape in the X direction of the third constituting part 123 is closed. There is formed a wall part 1233 extending in the −Z direction and −Y direction from the first opening part 1231, and forming openings in the Z direction side and the −Y direction side.

Figure 4A:
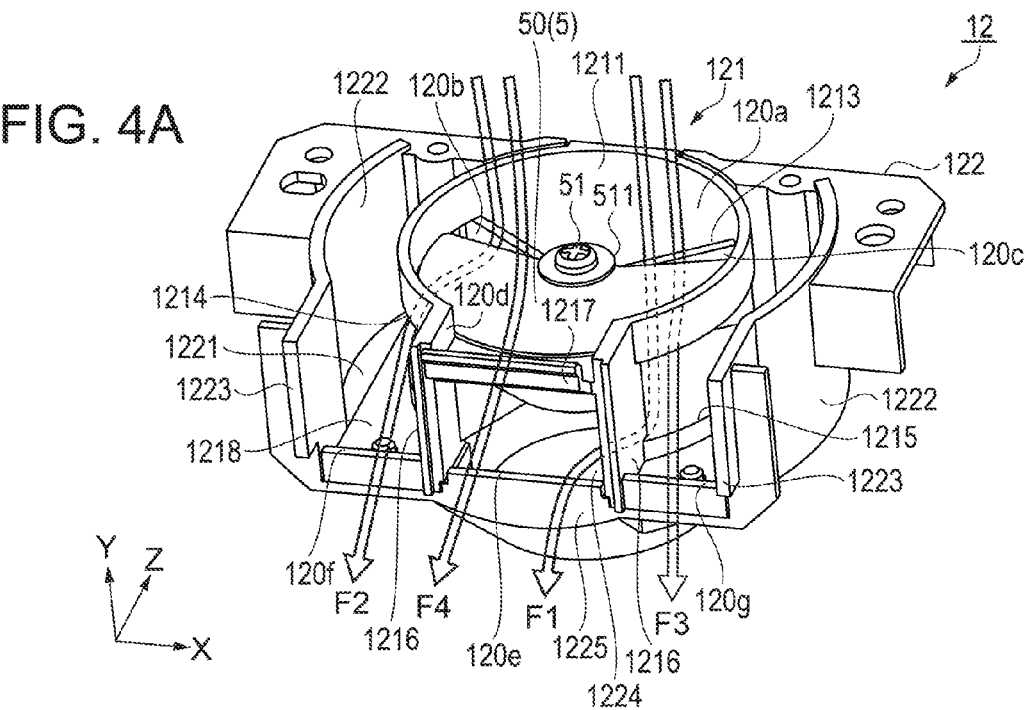
FIGS. 4A and 4B are perspective views each showing the flow channel constituting part.
Figure 4B:
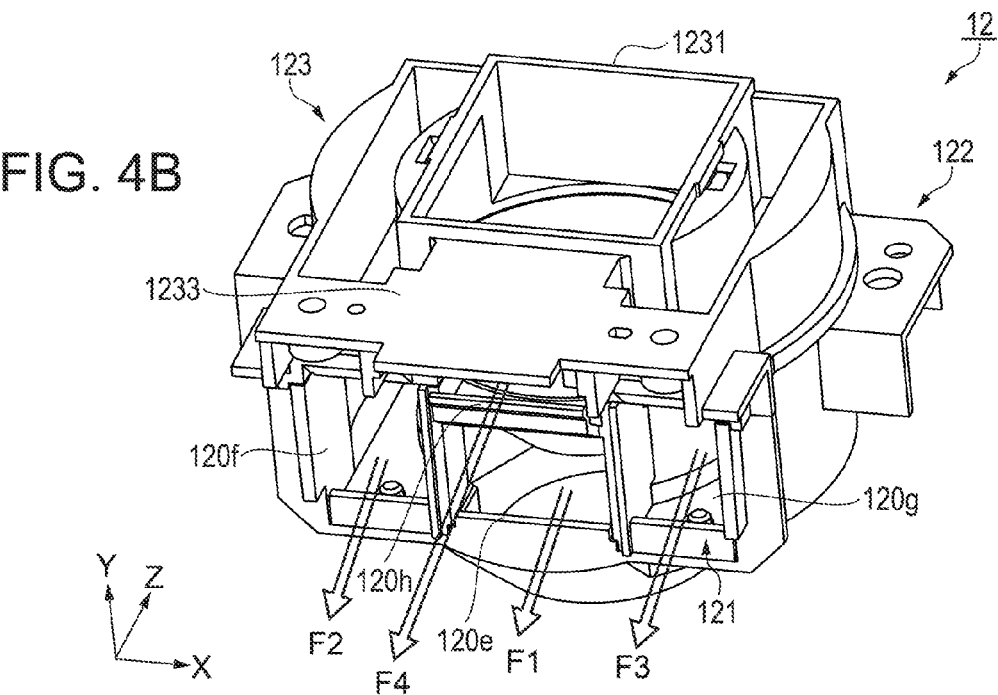

FIGS. 4A and 4B are perspective views showing the flow channel constituting part 12, wherein FIG. 4A is a perspective view of the state in which the first constituting part 121 provided with the opening and closing part 5 is disposed in the second constituting part 122, and FIG. 4B is a perspective view showing the state in which the third constituting part 123 is further disposed in the second constituting part 122 to complete the flow channel constituting part 12.

In assembling the flow channel constituting part 12, firstly, the rotary member 50 is installed in the first constituting part 121 as shown in FIG. 4A. Then, by making the base part 1218 of the first constituting part 121 abut on the abutting part 1221 of the second constituting part 122, the first constituting part 121 is attached to the second constituting part 122.

Due to the assembling, there is constituted a first outlet port 120e, which is surrounded by end parts on the extension side of the extending parts 1216, 1217 of the first constituting part 121 and the tilted part 1225 of the second constituting part 122, and is communicated with the first inlet port 120a. Thus, there is formed a flow channel F1 extending from the first inlet port 120a to the first outlet port 120e. Due to the flow channel F1, the cooling air introduced from the first inlet port 120a flows through the recessed part 1224, and then flows out from the first outlet port 120e formed so as to be surrounded by the extending parts 1216, 1217 and the tilted part 1225.

The third constituting part 123 is installed in the second constituting part 122 in which the first constituting part 121 is installed as shown in FIG. 4B, to thereby complete the flow channel constituting part 12. Due to the assembling, on the −X direction side, there is constituted a first outlet port 120f, which is surrounded by the extending part 1216 of the first constituting part 121, the extending part 1223 of the second constituting part 122, the base part 1218, and the wall part 1233 of the third constituting part 123, and is communicated with the first inlet port 120b. Thus, there is formed a flow channel F2 extending from the first inlet port 120b to the first outlet port 120f. Due to the flow channel F2, the cooling air introduced from the first inlet port 120b flows through the opening part 1214, then flows through a flow channel formed so as to be surrounded by the main body 1211, the wall part 1222 and the base part 1218, and the wall part 1233, and then flows out from the first outlet port 120f.

Similarly, on the +X direction side, there is constituted a first outlet port 120g, which is surrounded by the extending part 1216 of the first constituting part 121, the extending part 1223 of the second constituting part 122, the base part 1218, and the wall part 1233 of the third constituting part 123, and is communicated with the first inlet port 120c. Thus, there is formed a flow channel F3 extending from the first inlet port 120c to the first outlet port 120g. Due to the flow channel F3, the cooling air introduced from the first inlet port 120c flows through the opening part 1215, then flows through a flow channel formed so as to be surrounded by the main body 1211, the wall part 1222, the base part 1218, and the wall part 1233, and then flows out from the first outlet port 120g.

It should be noted that a connection part between the main body 1211 and the extending parts 1216, 1217 of the first constituting part 121 is surrounded by the wall part 1233 of the third constituting part 123 to thereby form the second inlet port 120d. It should be noted that the second inlet port 120d is formed so that the cooling air is introduced in the direction roughly perpendicular to the central axis (the stationary shaft 1212) on the anterior side of an area where the cooling air blows against the rotary member 50. Further, tip parts on the extension side of the extending parts 1216, 1217 of the first constituting part 121 is surrounded by the wall part 1233 of the third constituting part 123 to thereby form the second outlet port 120h. Thus, there is formed a flow channel F4 extending from the second inlet port 120d to the second outlet port 120h. Due to the flow channel F4, the cooling air introduced from the second inlet port 120d flows through a flow channel surrounded by the extending parts 1216, 1217 and the wall part 1233, and then flows out from the second outlet port 120*h*.

Figure 5A:
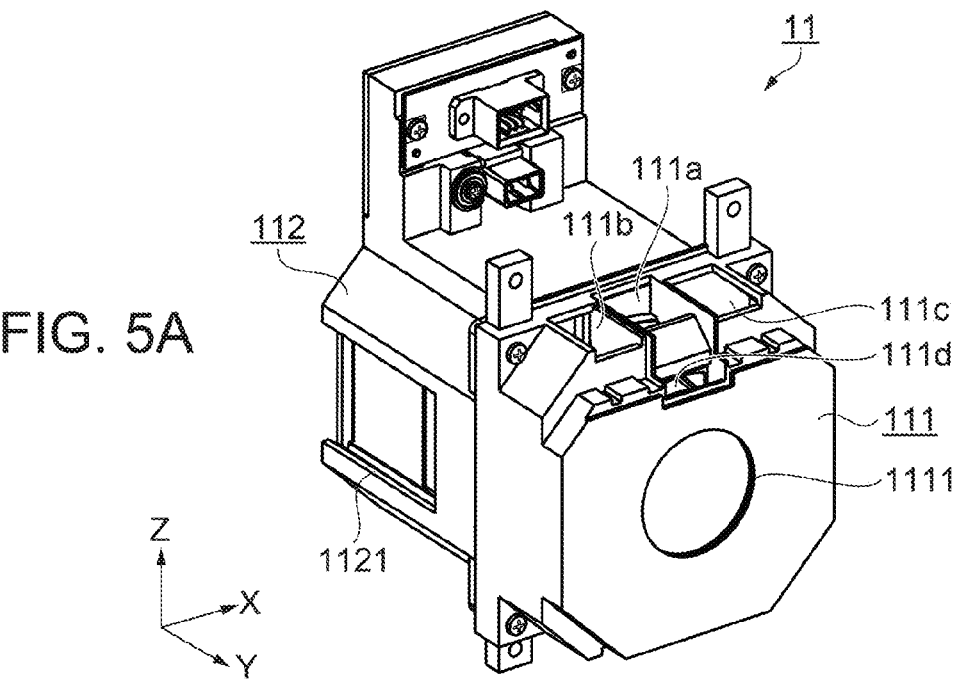
FIGS. 5A and 5B are perspective views each showing a light source device.
Figure 5B:
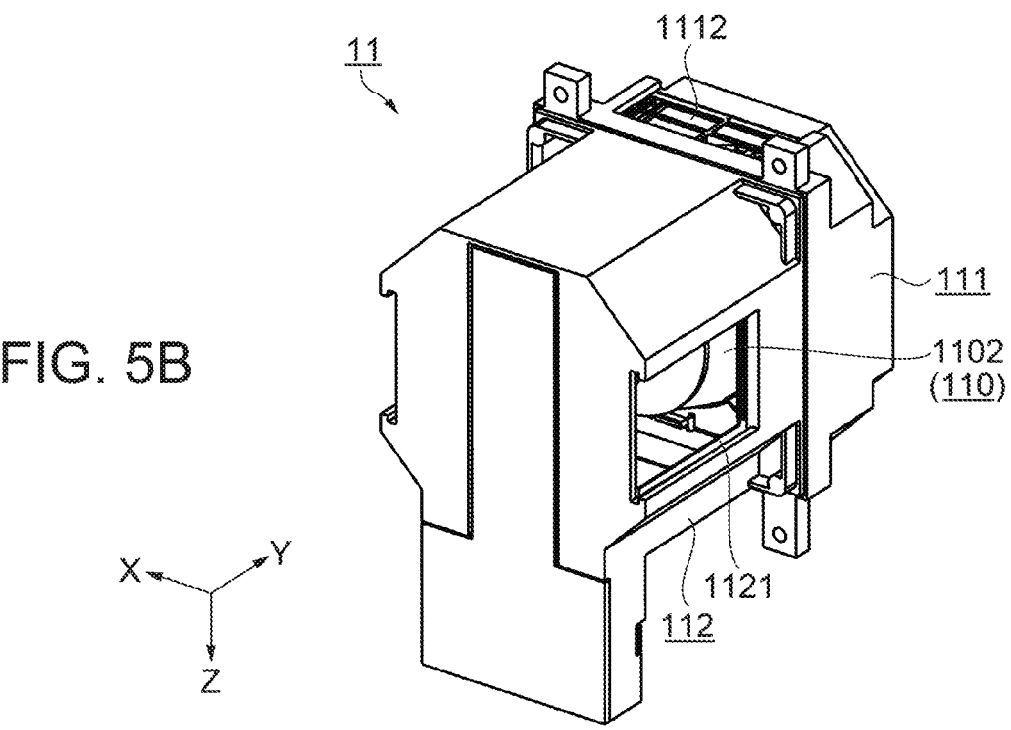

FIGS. 5A and 5B are perspective views showing the light source device 11, wherein FIG. 5A is a perspective view viewed from a light exit side, and FIG. 5B is a perspective view viewed from an opposite side to the light exit side by turning the light source device 11 upside down. FIGS. 6A and 6B are diagrams showing the light source device unit 10, wherein FIG. 6A is a front view viewed from the light exit side, and FIG. 6B is a cross-sectional view cutting the light source device unit 10 by the Y-Z plane including the stationary shaft 1212. It should be noted that as the light source device unit 10 shown in FIGS. 6A and 6B, there is shown the light source device unit 10 used for the normal mounting posture of the projector 1, and the rotary member 50 is provided. Further, the rotational position of the rotary member 50 shows the case in which the projector 1 is installed in the state of being parallel to the desktop surface D (the desktop surface D and the projection optical axis C2 are parallel to each other).

As shown in FIGS. 5A and 5B, the light source device 11 is constituted by the light source 110, the outflow port constituting part 111, and a light source case 112. As shown in FIG. 6B, the light source 110 is provided with the light emitting tube 1101 for emitting light to output the light beam, and the reflector 1102 for reflecting the light beam thus output toward the uniform direction (the +Y direction in FIG. 6B).

The outflow port constituting part 111 is formed to have a roughly box-like shape and houses the +Y side (the opening side of the reflector 1102) of the light source 110. The outflow port constituting part 111 is provided with an opening part 1111 for transmitting the light beam output from the light source 110 formed in a central part. The outflow port constituting part 111 is a member for making the cooling air from the inlet port constituting part 120 flow out to the inside of the light source 110.

The outflow port constituting part 111 is provided with three first outflow ports 111*a*, 111*b*, and 111*c*, and one second outflow port 111*d* disposed in an upper surface located on the +Z direction side. The first outflow ports 111*a*, 111*b*, and 111*c* are formed to have a roughly rectangular shape so as to be arranged in the X direction. The second outflow port 111*d* is constituted on the +Y direction side of the first outflow port 111*a*. As shown in FIG. 5B, on the lower surface located on the −Z direction side of the outflow port constituting part 111, there is formed an exhaust port 1112 through which the cooling air having flown inside the light source 110 and having been warmed is discharged to the outside from the light source device 11.

The light source case 112 is formed to have a roughly box-like shape and houses the back side of the light source 110 (the reflector 1102). The light source case 112 is provided with an opening part 1121 formed in the side surface on the X direction side to improve the radiation performance of the light source 110. The light source device 11 is completed by holding the light source 110 on the both sides with the outflow port constituting part 111 and the light source case 112, and then fixing them with screws.

The light source device 11 is installed in the flow channel constituting part 12. More precisely, the flow channel constituting part 12 is installed in an inlet port fixation part 204 provided to a cartridge case 201 of the light source cartridge 20 described later. Further, the light source device 11 is similarly installed in a light source device housing part 205 provided to the cartridge case 201. Due to the assembling, there occurs the state in which the light source device 11 and the flow channel constituting part 12 are engaged with each other, and thus, the light source device unit 10 is constituted. It should be noted that the light source device 11 is detachably attached to the cartridge case 201 (the flow channel constituting part 12).

In the case in which the light source 11 is installed in the flow channel constituting part 12, as shown in FIGS. 4B, 5A, and 6B, the first outlet port 120*e* (the first inlet port 120*a*) of the flow channel constituting part 12 and the first outflow port 111*a* of the light source device 11 are communicated with each other. Further, as shown in FIGS. 4B and 5A, the first outlet port 120*f* (the first inlet port 120*b*) and the first outflow port 111*b* are communicated with each other. Further, the first outlet port 120*g* (the first inlet port 120*c*) and the first outflow port 111*c* are communicated with each other. Further, as shown in FIGS. 4B, 5A, and 6B, the second outlet port 120*h* (the second inlet port 120*d*) and the second outflow port 111*d* are communicated with each other.

Here, as shown in FIG. 6A, in the case in which the projector 1 is installed in the state of being parallel to the desktop surface D (the desktop surface D and the projection optical axis C2 are parallel to each other), the rotary member 50 rotates to a position where the first inlet port 120*a* not opposed to the rotary member 50 is opened, and at the same time, an upper part of each of the first inlet ports 120*b*, 120*c* is also opened. Therefore, the cooling air flows through the flow channel F1 described above, and at the same time, a part of the cooling air also flows through each of the flow channels F2, F3. Further, the cooling air also flows through the flow channel F4 disposed on the anterior side of the rotary member 50.

The flow of the cooling air in the flow channel F1 will be described with reference to FIG. 6B.

The cooling air introduced from the first inlet port 120*a* flows (flows through the flow channel F1) inside the inlet port constituting part 120 as indicated by the arrow, and is introduced from the first outlet port 120*e* to the first outflow port 111*a* of the light source device 11 communicated therewith. The cooling air introduced into the first outflow port 111*a* is restricted in the flow direction by a flow control plate 1113 provided to the first outflow port 111*a*, and thus, flows out to the inside of the light source 110.

The cooling air restricted by the flow control plate 1113 flows along the inner surface of the reflector 1102, and flows so as to surround the light emitting part 1101*a* of the light emitting tube 1101. Then, the cooling air flows along the inner surface of the reflector 1102, and then flows out from the exhaust port 1112 of the outflow port constituting part 111 to the outside of the light source device 11. Thus, the cooling air draws the heat of the light emitting tube 1101, and the light emitting part 1101*a* generating the largest amount of heat of the light emitting tube 1101, to cool the light emitting tube 1101.

Then, the flow of the cooling air in the flow channel F2 will be described.

The cooling air introduced from the first inlet port 120*b* flows through the flow channel F2 as shown in FIGS. 4A, 4B, 5A, and 5B, and is introduced from the first outlet port 120*f* to the first outflow port 111*b* of the light source device 11 communicated therewith. The cooling air introduced into the first outflow port 111*b* flows out to the inside of the light source 110 on the −X direction side of the light emitting tube 1101 via an outflow port 111*f* (FIG. 6B) provided to the outflow port constituting part 111.

The cooling air having flown out to the inside of the light source 110 from the outflow port 111*f* flows along the inner surface of the reflector 1102, and flows so as to surround the light emitting part 1101a of the light emitting tube 1101. Then, the cooling air flows along the inner surface of the reflector 1102, and then flows out from the exhaust port 1112 to the outside of the light source device 11. Thus, the cooling air draws the heat on the side surface side of the light emitting tube 1101 to cool the light emitting tube 1101.

Then, the flow of the cooling air in the flow channel F3 will be described.

The flow of the cooling air in the flow channel F3 is symmetric to the flow of the cooling air in the flow channel F2 described above about the Y-Z plane passing through the stationary shaft 1212. The cooling air introduced from the first inlet port 120c flows through the flow channel F3 as shown in FIGS. 4A, 4B, 5A, and 5B, and is introduced from the first outlet port 120g into the first outflow port 111c of the light source device 11 communicated therewith. The cooling air introduced into the first outflow port 111c flows out to the inside of the light source 110 on the +X direction side of the light emitting tube 1101 via an outflow port 111g (FIG. 6B) provided to the outflow port constituting part 111.

The cooling air having flown out to the inside of the light source 110 from the outflow port 111g flows along the inner surface of the reflector 1102, then flows so as to surround the light emitting part 1101a of the light emitting tube 1101, then flows along the inner surface of the reflector 1102, and then flows out from the exhaust port 1112 to the outside of the light source device 11. Thus, the cooling air draws the heat on the side surface side of the light emitting tube 1101 to cool the light emitting tube 1101.

Then, the flow of the cooling air in the flow channel F4 will be described.

The second inlet port 120d is disposed on the anterior side of the rotary member 50, and is therefore not closed by the rotary member 50. As the cooling air introduced into the second inlet port 120d, there is introduced the cooling air immediately before flowing into the rotary member 50. Then, the cooling air is introduced into the second inlet port 120d so as to be substantially perpendicular to the stationary shaft 1212. Further, due to the position of the rotary member 50, the cooling air bouncing back from the rotary member 50 is introduced. However, regarding the cooling air bouncing back from the rotary member 50, since the amount of the cooling air bouncing back is different by the rotational position of the rotary member 50, the amount to be introduced varies. As shown in FIG. 6A, in the case in which the rotary member 50 is installed in the state in which the projector 1 is parallel to the desktop surface D (the desktop surface D and the projection optical axis C2 are parallel to each other), the amount of the cooling air bouncing back from the rotary member 50 becomes the largest.

The cooling air introduced from the second inlet port 120d flows through the flow channel F4 as shown in FIG. 6B, and is introduced from the second outlet port 120h into the second outflow port 111d of the light source device 11 communicated therewith. The cooling air introduced into the second outflow port 111d is restricted in the flow direction by the flow control plate 1113, and thus, flows out to the inside of the light source 110.

The cooling air restricted by the flow control plate 1113 flows on the opening side of the reflector 1102 in the downward direction (−Z direction), then flows so as to surround the tip area of the light emitting tube 1101, and then flows out from the exhaust port 1112 to the outside of the light source device 11. Thus, the cooling air draws the heat generated in a welded part (a connection part between a metal foil and a lead wire) of the light emitting tube 1101 to thereby cool the welded part.

Figure 7A:
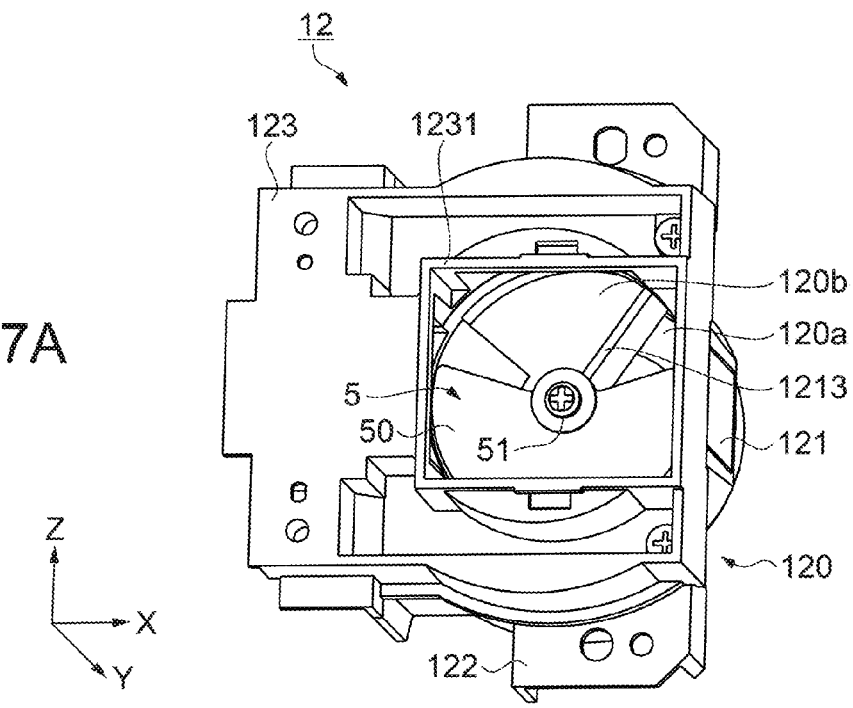
FIGS. 7A and 7B are perspective views each showing the flow channel constituting part.
Figure 7B:
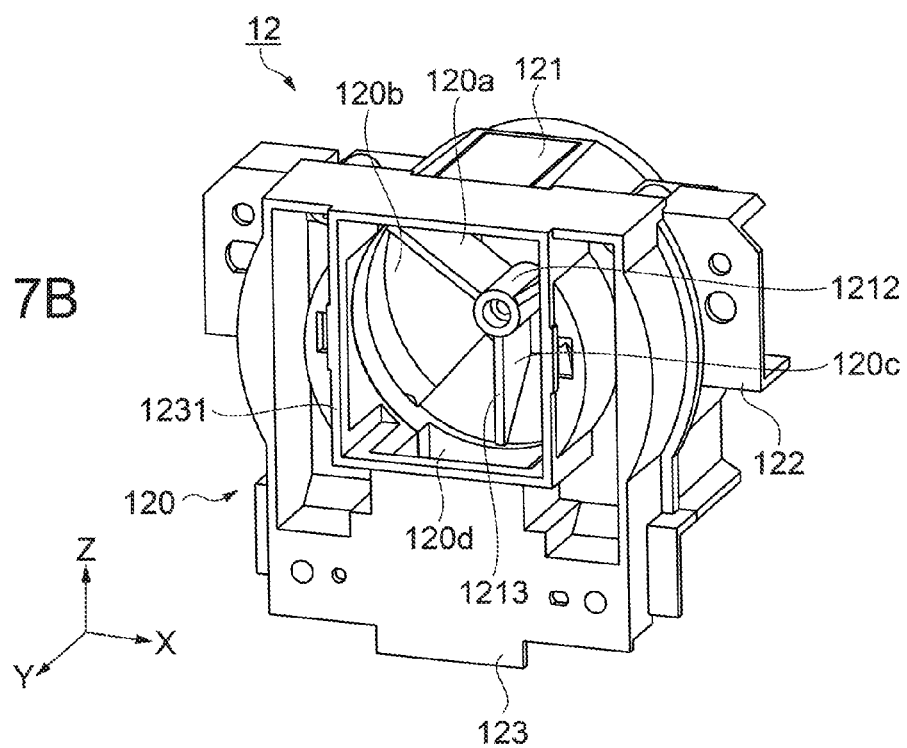

FIGS. 7A and 7B are perspective views showing the flow channel constituting part 12, wherein FIG. 7A is a perspective view showing the flow channel constituting part 12 in the case in which the projector 1 is mounted in the normal mounting posture, and is mounted at the tilt angle of about 90°, and FIG. 7B is a perspective view showing the flow channel constituting part 12 used in the case in which the projector 1 is mounted in the side-surface mounting posture. It should be noted that as the flow channel constituting part 12 shown in FIG. 7A, there is cited the flow channel constituting part 12 provided to the light source device unit 10 used in the light source cartridge 20b for the right side among the light source cartridges 20 for the normal mounting posture for the sake of convenience of explanation.

In FIGS. 6A and 6B, there is shown the case in which the projector 1 is mounted in the normal mounting posture, and the tilt angle (the angle between the projection optical axis C2 and the desktop surface D) is 0° as an example. In the case in which the projector 1 is kept in the normal mounting posture, and the tilt angle is changed from 0° to 90°, the rotary member 50 is driven by the change in the tilt angle to rotate roughly 90° under its own weight as shown in FIG. 7A.

In this state, the rotary member 50 closes the entire area of the first inlet port 120c opposed to the rotary member 50. Further, the rotary member 50 becomes in the state in which the areas of the first inlet ports 120a, 120b not opposed to the rotary member 50 are opened. Thus, the cooling air having flown from the first opening part 1231 is introduced from the opened area of the first inlet ports 120a, 120b. Then, the cooling air introduced into the first inlet ports 120a, 120b flows through the flow channels F1, F2, then flows through the inside of the light source 110 as described above to cool the light emitting tube 1101.

As shown in FIG. 7B, in the present embodiment, there is also used the flow channel constituting part 12 not provided with the opening and closing part 5 (e.g., the rotary member 50) and formed only of the inlet port constituting part 120. The flow channel constituting part 12 not provided with the opening and closing part 5 is used for the light source device unit 10 installed in the light source cartridges 21 (both of the light source cartridge 21a for the left side and the light source cartridge 21b for the right side) for the side-surface mounting posture. In the light source device unit 10 constituted by such a flow channel constituting part 12 not provided with the opening and closing part 5, the cooling air inflowing from the first opening part 1231 is always introduced from the first inlet ports 120a, 120b, and 120c with the flow amount corresponding respectively to the opening spaces of the first inlet ports 120a, 120b, and 120c. Further, the cooling air with an appropriate flow amount is also introduced into the second inlet port 120d.

The reason that the opening and closing part 5 is not provided is as follows. Since the light source cartridge 21 for the side-surface mounting posture is used in the posture rotated roughly 90° centered on the optical axis C1 in the case of the normal mounting posture, the light source cartridge 21a for the left side is located on the lower side (the −Z side), and the light source cartridge 21b for the right side is located on the upper side (the +Z side). Therefore, since the cooling efficiency drops in the side-surface mounting posture compared to the cooling of the light source 110 in the normal mounting posture, it is necessary to make the cooling air inflow with roughly the maximum flow amount without using the opening and closing part 5.

FIGS. 8A through 8C are perspective views showing the light source cartridge 20, wherein FIG. 8A is a perspective view with the light source device 11 removed, FIG. 8B is a perspective view with the light source device 11 installed, and FIG. 8C is a perspective view of the light source cartridge 20 viewed from the light exit direction. It should be noted that for the sake of convenience of explanation, in FIGS. 8A through 8C, description will be presented using the light source cartridge 20a for the left side among the light source cartridges 20 for the normal mounting posture.

The light source cartridge 20a for the normal mounting posture is provided with the cartridge case 201a for the left side. To the cartridge case 201a, there are installed the light source 11 constituting the light source device unit 10, and the flow channel constituting part 12. It should be noted that in the flow channel constituting part 12, there is installed the rotary member 50.

To the cartridge case 201a having roughly box-like shape having a rectangular shape, there is installed a radiator plate 202 provided with a plurality of holes 2021 each having a slit shape on the side surface on the −X side. Further, in an end part of the radiator plate 202, there is installed a hand grip 203 to be gripped when the light source cartridge 20a is attached to and removed from a predetermined place inside the exterior housing 1A. Further, the light source cartridge 20a according to the present embodiment has a structure provided with two light source device units 10 (each formed of the light source device 11 and the flow channel constituting part 12 corresponding to the light source device).

It should be noted that when mounting the light source cartridge 20a to the projector 1, a cover member 1B shown in FIGS. 1A and 1B is removed, and then the light source cartridge 20a is inserted into the exterior housing 1A gripping the hand grip 203 of the light source cartridge 20a. In the present embodiment, by sliding the light source cartridge 20a for the left side along the cartridge housing (not shown) for the left side mounting provided to the inside of the exterior housing 1A, the light source cartridge 20a can be mounted. By mounting the light source cartridge 20a, there is obtained the state in which connectors for achieving the electrical connection to the light source device 11 are connected to each other. It should be noted that on the right side, there is provided the cartridge housing part (not shown) for the right side mounting, and the light source cartridge 20b for the right side is mounted in a similar manner.

A main body 2011 having a rectangular shape of the cartridge case 201a is provided with two inlet ports 2012 each having a rectangular shape as shown in FIG. 8C, and by installing the flow channel constituting parts 12 in the main body 2011, the first opening parts 1231 adhere to the inlet ports 2012, respectively. Further, in the case of mounting the light source cartridge 20a to the projector 1, the inlet ports 2012 adhere to the tip parts of the ducts (not shown) communicated with the cooling fans 9, respectively. In detail, the cooling fans 9 and the ducts are disposed so as to be fixed to the inside of the exterior housing 1A, and when mounting the light source cartridge 20a by sliding, there is achieved the state in which the inlet ports 2012 adhere to the tip parts of the ducts, respectively. Thus, the cooling air fed from the cooling fan 9 flows through the duct, and is then introduced into the first opening part 1231 via the inlet port 2012.

Further, in the main body 2011 of the cartridge case 201a, there are formed opening parts 2013 each having a circular shape on the downward direction (the −Z direction) side of the inlet ports 2012, respectively, and by installing the light source devices 11 in the main body 2011, the opening parts 1111 of the light source devices 11 are disposed so as to be opposed to the opening parts 2013, respectively. Thus, the light beam emitted from the light source device 11 is output in the +Y direction via the opening part 2013.

As shown in FIG. 8A, the main body 2011 is provided with inlet port fixation parts 204 for respectively fixing the flow channel constituting parts 12 (the inlet port constituting part 120) on the −Y side. Each of the inlet port fixation parts 204 is formed of a plurality of fixing protrusions or the like, and by guiding the flow channel constituting part 12 along the fixing protrusions to set the flow channel constituting part 12, and then screwing the flow channel constituting part 12, the flow channel constituting part 12 is fixed to the inlet port fixation part 204.

Further, as shown in FIG. 8A, the main body 2011 is provided with light source device housing parts 205 for detachably housing the light source devices 11, respectively, on the −Y side. Each of the light source device housing parts 205 is formed of a plurality of fixing protrusions or the like, and by guiding the light source device 11 along the fixing protrusions to set the light source device 11, and then screwing the light source device 11, the light source device 11 is fixed to the light source device housing part 205. It should be noted that when replacing the light source device 11, the screws having been fixed are removed, and then the light source device 11 is detached from the light source device housing part 205. Then, a new light source device 11 is fixed to the light source device housing part 205.

Hereinabove, the light source cartridge 20a for the left side provided to the light source cartridge 20 for the normal mounting posture is described as an example. It should be noted that the members constituting the light source cartridge 20b for the right side are configured similarly to those of the light source cartridge 20a for the left side. It should be noted that the members are configured so as to be symmetric thereto with respect to a vertical plane (the X-Z plane) passing through the optical axis C1. Further, the light source cartridges 21 for the side-surface mounting posture are also formed of the light source cartridge 21a for the left side and the light source cartridge 21b for the right side similarly to the light source cartridges 20 for the normal mounting posture. Further, the members constituting the light source cartridges 21a, 21b for the left side and the right side are similarly configured corresponding to those of the light source cartridges 20a, 20b for the left side and the right side. It should be noted that as described above, the difference between the light source cartridge 20 for the normal mounting posture and the light source cartridge 21 for the side-surface mounting posture is as follows. In the light source cartridge 20 for the normal mounting posture, there is used the flow channel constituting part 12 (the light source device unit 10) with the opening and closing part 5, and in the light source cartridge 21 for the side-surface mounting posture, there is used the flow channel constituting part 12 (the light source device unit 10) without the opening and closing part 5.

It should be noted that the light source device unit 10 with the opening and closing part 5 corresponds to a first light source device unit, and the light source device unit 10 without the opening and closing part 5 corresponds to a second light source device unit. Further, the light source cartridge provided with the first light source drive unit corresponds to the light source cartridge 20 (a first light source cartridge) for the normal mounting posture in the present embodiment as described above, and the light source cartridge provided with the second light source drive unit corresponds to the light source cartridge 21 (a second light source cartridge) for the side-surface mounting posture in the present embodiment as described above.

Figure 9A:
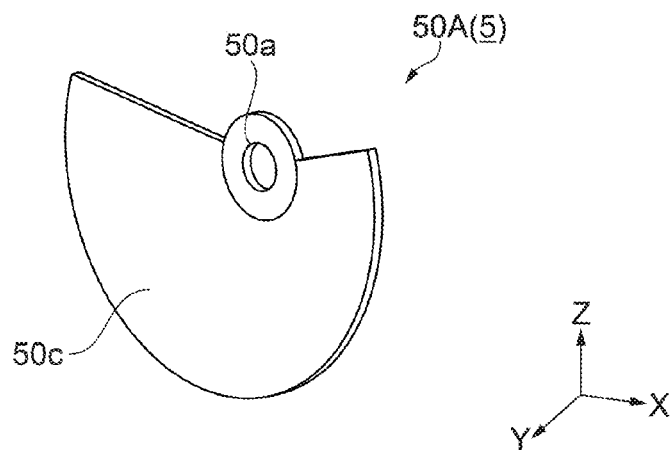
FIGS. 9A and 9B are diagrams showing another example of a rotary member constituting an opening and closing part.
Figure 9B:
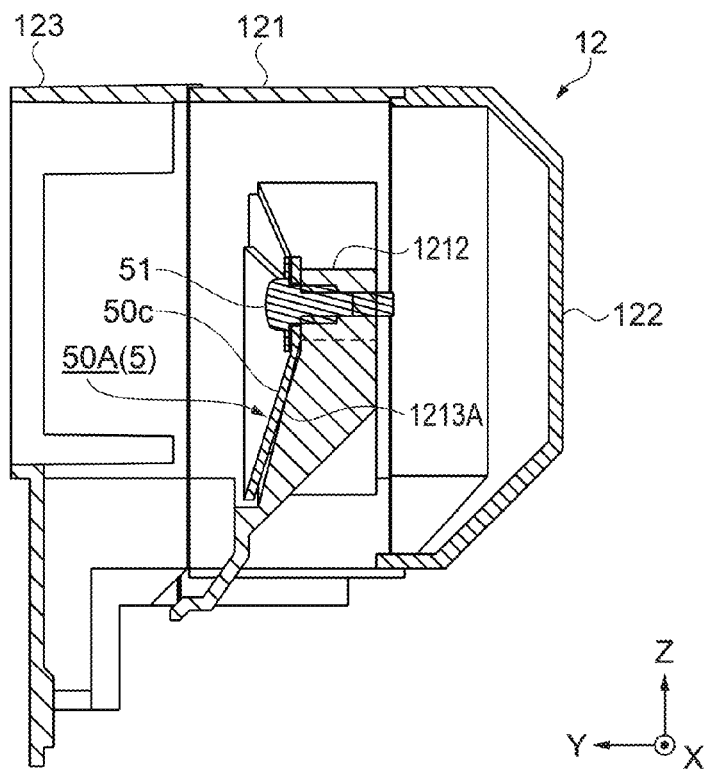

FIGS. 9A and 9B are diagrams showing another example of the rotary member 50 constituting the opening and closing part 5. It should be noted that FIGS. 9A and 9B are diagrams showing a rotary member 50A as another example of the rotary member 50, wherein FIG. 9A is a perspective view of the rotary member 50A, and FIG. 9B is a cross-sectional view in which the rotary member 50A is installed in the flow channel constituting part 12 corresponding to the rotary member 50A.

As shown in FIGS. 6A and 6B, in the rotary member 50 constituting the opening and closing part 5, the shape of the surface 50b, which the cooling air blows against, of the rotary member 50 is arranged to be the shape roughly perpendicular to the stationary shaft 1212. Besides such a rotary member 50, in the present embodiment, it is possible to use a rotary member (referred to as the rotary member 50A) having a shape of a surface 50c shown in FIG. 9A.

In detail, the rotary member 50A is provided with a conically-expanding centered on the rotational center hole 50a (the stationary shaft 1212) as shown in FIG. 9A. In detail, the rotary member 50A conically expands in the +Y direction centered on the rotational center hole 50a. It should be noted that the planar shape of the rotary member 50A is arranged to be roughly the same as the shape of the rotary member 50 described above. Due to the shape, the shape of the surface 50c, which the cooling air blows against, of the rotary member 50A is the shape tilted with respect to (obliquely crossing) the stationary shaft 1212 as shown in FIG. 9B. Further, in order to make the rotary member 50A rotatable, the shape of the wall part 1213 separating the first inlet ports 120a, 120b, and 120c from each other is made to coincide with the conical outer surface of the rotary member 50A to newly form a wall part 1213A. The rotary member 50A formed in such a manner rotates under its own weight so as to be located vertically below the stationary shaft 1212 similarly to the rotary member 50.

According to the embodiment described above, the following advantages can be obtained.

According to the light source device unit 10 of the present embodiment, the light source device unit 10 is configured including the light source device 11 and the flow channel constituting part 12. The light source device 11 is provided with the light source 110 having the light emitting tube 1101 and the reflector 1102, and the outflow port constituting part 111 housing the light source 110 and having the first outflow ports 111a through 111c. The flow channel constituting part 12 is provided with the inlet port constituting part 120 having the first inlet ports 120a through 120c, and the opening and closing part 5 for selectively opening and closing the first inlet ports 120a through 120c. Due to the configuration described above, the cooling air is introduced from the first inlet ports 120a through 120c opened by the opening and closing part 5, and then flows out from the first outflow ports 111a through 111c communicated with the first inlet ports 120a through 120c toward the light emitting tube 1101. Thus, the cooling air can be fed to the light emitting tube 1101. Further, since the opening and closing part 5 rotates around the stationary shaft 1212 in accordance with the posture of the light source device 11 to thereby select (open) the first inlet ports 120a through 120c from which the cooling air is introduced, it is possible to introduce the cooling air into the first inlet ports 120a through 120c opened in accordance with the posture of the light source device 11, and then make the cooling air flow out from the first outflow ports 111a through 111c. Therefore, according to the light source device unit 10, it becomes possible to switch the flow channels (the first inlet ports 120a through 120c) of the flow channel constituting part 12 in accordance with the posture of the light source device 11, and it is possible to perform appropriate cooling in accordance with the posture of the light source device 11.

According to the light source device unit 10 of the present embodiment, the rotary members 50, 50A rotate under its own weight to thereby selectively open and close the three first inlet ports 120a, 120b, and 120c. Due to the configuration, it is unnecessary to provide a drive section for driving the rotary member, a control section for controlling the drive section or the like, and it becomes possible to selectively open and close the first inlet ports 120a, 120b, and 120c with a simple structure.

According to the light source drive unit 10 of the present embodiment, the rotary member 50 is formed to have the shape obtained by connecting the stationary shaft 1212 and both of the ends of the circular arc centered on the stationary shaft 1212, in general, in a planar view. Further, in the case in which the rotary member 50 rotates, the first inlet ports 120a, 120b, and 120c opposed to the rotary member 50 are closed, and the first inlet ports 120a, 120b, and 120c not opposed to the rotary member 50 are opened. Thus, it is possible to configure the structure of selectively opening and closing the three first inlet ports 120a, 120b, and 120c.

According to the light source device unit 10 of the present embodiment, the flow channel constituting part 12 is provided with the second inlet port 120d into which the cooling air is introduced in the direction roughly perpendicular to the stationary shaft 1212 on the anterior side of the rotary member 50 with respect to the first inlet ports 120a, 120b, and 120c disposed on the posterior side of the rotary member 50 in the cooling air flow channel from the cooling fan 9. Further, the outflow port constituting part 111 of the light source device 11 is provided with the second outflow port 111d communicated with the second inlet port 120d. Due to the second inlet port 120d provided on the anterior side of the rotary member 50, it is possible to make it easy for the cooling air to flow to the welded part located on the anterior side of the light emitting tube 1101, to which the cooling air is difficult to flow from the first inlet ports 120a, 120b, and 120c disposed on the posterior side, irrespective of the mounting posture of the projector 1. Further, since the second inlet port 120d located on the anterior side introduces the cooling air in the direction roughly perpendicular to the stationary shaft 1212, the area in the planar view of the periphery of the rotary member 50 can be reduced compared to, for example, the structure provided with an inlet port for introducing the cooling air roughly in parallel to the stationary shaft 1212, and thus, the periphery of the rotary member 50 can be miniaturized.

According to the light source device unit 10 of the present embodiment, the shape of the surface 50b, which the cooling air blows against, of the rotary member 50 includes a shape perpendicular to the stationary shaft 1212. Further, the shape of the surface 50c, which the cooling air blows against, of the rotary member 50A includes a shape tilted with respect to the stationary shaft 1212. Thus, it becomes possible for the rotary members 50, 50A to control the amount of the cooling air introduced into the first inlet ports 120a, 120b, and 120c to be opened in addition to selectively opening and closing the first inlet ports 120a, 120b, and 120c located on the posterior side of the cooling air flow channel of the rotary members 50, 50A. The same applies to the second inlet port 120d disposed on the anterior side of the rotary members 50, 50A. According to this configuration, it becomes possible to perform further appropriate cooling, efficient cooling in accordance with the posture of the light source device 11.

According to the light source cartridge 20 of the present embodiment, the light source cartridge 20 is configured including the light source device unit 10 and the cartridge case 201. Further, the light source device 11 is detachably housed in the light source device housing part 205 of the cartridge case 201. Further, the inlet port constituting part 120 is fixed to the inlet port fixation part 204 of the cartridge case 201. Then, in the case in which the light source device 11 is mounted in the light source device housing part 205, the first inlet ports 120a through 120c and the second inlet port 120d are communicated with the first outflow ports 111a through 111c and the second outflow port 111d, respectively. Therefore, for example, in the case of replacing the light source device 11, only by detaching the old light source device 11 and then mounting a new light source device 11, the first outflow ports 111a through 111c and the second outflow port 111d of the light source device 11 can easily be communicated with the first inlet ports 120a through 120c and the second inlet port 120d of the inlet port constituting part 120 fixed to the cartridge case 201. Therefore, it is possible to easily perform the replacement of the light source device 11 in the light source cartridge 20. Further, since the inlet port constituting part 120 and the light source device 11 are provided separately from each other, there is no need to replace the inlet port constituting part 120 at the same time as the replacement of the light source device 11, and therefore, the cost of the replacement parts can be reduced.

According to the light source cartridge 20 of the present embodiment, since the two light source devices 11 are mounted, a high-luminance light source can be achieved. Further, when replacing the light source device 11, since the light source cartridge 20 in which the two light source devices 11 are mounted is detached from the projector 1, and then each of the light source devices 11 can be replaced, handling as the light source becomes easy compared to the case in which the two light source device units 10 are individually mounted in the projector 1.

Further, since the inlet port constituting parts 120 are mounted corresponding respectively to the two light source devices 11, it is possible to connect the light source device 11 to the inlet port constituting part 120 only by replacing the light source device 11. Therefore, it is unnecessary to make the first inlet ports 120a through 120c and the second inlet port 120d communicate with the first outflow ports 111a through 111c and the second outflow port 111d, and thus, the replaceability of the light source device 11 can be improved.

Further, by mounting the inlet port constituting parts 120 corresponding respectively to the two light source devices 11, cooling of the light source device 11 can appropriately be performed in accordance with the posture (the posture of the light source cartridge 20) of the light source device 11.

According to the light source cartridge 21 of the present embodiment, there are provided the flow channel constituting parts 12 configured without including the opening and closing part 5. According to such a light source cartridge 21, since the opening and closing part 5 is not included, the cooling air can be introduced into the first inlet ports 120a, 120b, and 120c without selectively opening or closing the first inlet ports 120a, 120b, and 120c. Therefore, it becomes possible to deal with the case in which the light source device 11 is used for the side-surface mounting posture, and thus, the cooling of the light source device 11 can appropriately be performed.

According to the light source cartridges 20, 21 of the present embodiment, the difference between the light source cartridge 20 for the normal mounting posture and the light source cartridge 21 for the side-surface mounting posture is presence or absence of the opening and closing part 5. Further, the light source devices 11 have a common configuration irrespective of the mounting posture. Further, there is adopted the configuration in which the flow channel constituting part 12 including the opening and closing part 5 and the light source device 11 are separately fixed to the cartridge case (e.g., the cartridge case 201). Therefore, although it is required to use the light source cartridges 20, 21 properly in accordance with the mounting posture of the projector 1, regarding the replacement of the light source device 11, all of the operations can be performed using the common light source device 11 irrespective of the mounting posture. Thus, there can be improved the replaceability of the light source device 11 in the projector 1 used in the mounting postures of the normal mounting posture and the side-surface mounting posture different from each other.

According to the projector 1 of the present embodiment, since there is provided the light source cartridge 20 capable of appropriately cooling the light source device 11 in accordance with the mounting posture of the projector 1, it is possible to extend the life of the light source device 11 due to the mounting posture of the projector 1, and to keep the optical characteristics. Further, by detaching the light source cartridge 20 from the projector 1, attachment and detachment of the light source device 11 can easily be performed.

According to the projector 1 of the present embodiment, the light source cartridge 20 for the normal mounting posture is formed of the light source device unit 10 provided with the flow channel constituting part 12 with the opening and closing part 5, and the light source cartridge 21 for the side-surface mounting posture is formed of the light source device unit 10 provided with the flow channel constituting part 12 without the opening and closing part 5. Further, the two types of light source cartridges 20, 21 are used properly in accordance with the mounting posture of the projector 1. Since there are provided the two types of light source cartridges 20, 21 different in presence or absence of the opening and closing part 5 as described above, it is possible to deal with the mounting postures of the projector 1, and to appropriately cool the light source device 11. Further, according to such light source cartridges 20, 21, it is possible to use two light source devices 11 installed in one light source cartridge 20 (or light source cartridge 21). Therefore, it is possible to achieve the high-luminance projector 1 and the improvement in flexibility of mounting posture of the projector 1.

It should be noted that the invention is not limited to the embodiment described above, but can be implemented with a variety of modifications or improvements added within the scope or the spirit of the invention. Some modified examples will be described below.

Although in the projector 1 according to the embodiment described above, as the normal mounting posture, the desktop mounting posture is performed as a reference, this is not a limitation, and it is possible to perform the operation in the ceiling mounting posture.

In the description of the projector 1 according to the embodiment described above, there are cited the positions of the rotary member 50 in the case in which the projector 1 is mounted in the normal mounting posture (the desktop mounting posture), and the tilt angle is 0° (the projection optical axis C2 is horizontal (parallel to the desktop surface D)), and the case in which the tilt angle is 90°. However, the projector 1 can be mounted and can perform projection within the range of the tilt angle of 180° in each of the upward direction and the downward direction, in other words, the tilt angle of 360°, and it is possible for the rotary member 50 to rotate under its own weight to control the opening state of the first inlet ports 120a, 120b, and 120c in accordance with the tilt angle in the mounting posture.

In the projector 1 according to the embodiment described above, the light source cartridges 20, 21 are each configured so that the two light source devices 11 (the light source device units 10) are provided to one light source cartridge. However, the light source cartridges can also be configured so that the three or more light source devices 11 (the light source device units 10) are provided to one light source cartridge.

In the light source device unit 10 according to the embodiment described above, there are three inlet ports as the inlet ports to be selectively opened and closed by the rotary member 50. However, this is not a limitation, but the number of inlet ports to be selectively opened and closed by the rotary member 50 can be two, or can also be four or more. Further, it is sufficient to provide the outflow ports communicated with the inlet ports in accordance with the inlet ports.

In the flow channel constituting part 12 of the embodiment described above, the rotary member 50A constituting the opening and closing part 5 conically expands in the +Y direction centered on the rotational center hole 50a, and the surface 50c has the shape tilted with respect to (obliquely crossing) the stationary shaft 1212. However, besides the above, it is also possible to adopt a rotary member formed so as to conically expand in the –Y direction opposite to the direction in the rotary member 50A, and to have the surface having the shape tilted with respect to (obliquely crossing) the stationary shaft 1212. By forming the rotary member in such a manner, the amount of cooling air introduced into the inlet port can be controlled, and it is possible to preferentially introduce the cooling air into the inlet port corresponding to the place necessary to be cooled. In such a rotary member, it is possible to actively introduce the cooling air into the second inlet port 120d disposed on the anterior side of the rotary member to thereby efficiently cool the welded part of the light emitting tube 1101.

In the flow channel constituting part 12 of the embodiment described above, the rotary member 50 and the rotary member 50A each constituting the opening and closing part 5 are formed of a plate-like member, and have roughly uniform thickness. However, this is not a limitation, but it is also possible to arrange that the thickness increases as the distance from the rotational center hole 50a increases. By forming the rotary member in such a manner, the rotational moment can be increased, and the rotary member 50 or the rotary member 50A can smoothly rotate in accordance with the mounting posture of the projector 1.

In the flow channel constituting part 12 of the embodiment described above, the rotary member 50 constituting the opening and closing part 5 has the surface 50b, which the cooling air blows against, of the rotary member 50 arranged to be the shape perpendicular to the stationary shaft 1212. Further, the rotary member 50A conically expands in the +Y direction centered on the rotational center hole 50a, and the surface 50c, the cooling air blows against, of the rotary member 50A has the shape tilted with respect to (obliquely crossing) the stationary shaft 1212. However, this is not a limitation, but it is also possible to adopt a shape obtained by combining the shape perpendicular to the stationary shaft 1212 and the shape tilted with respect to (obliquely crossing) the stationary shaft 1212 with each other.

In the projector 1 according to the embodiment described above, the light modulation device uses the transmissive light modulation device (the transmissive liquid crystal panels 351). However, this is not a limitation, but it is also possible to use a reflective light modulation device.

In the projector 1 according to the embodiment described above, the liquid crystal panels 351 are used as the light modulation device. However, this is not a limitation, but it is generally sufficient to adopt those modulating the incident light beam based on the image signal, and it is possible to adopt light modulation devices using other systems such as a micromirror type light modulation device. It should be noted that as the micromirror type light modulation device, a Digital Micromirror Device (DMD), for example, can be adopted.

In the projector 1 according to the embodiment described above, the optical unit 3 uses the lens integrator optical system in order to homogenize the illuminance of the light (light beams) emitted by the light source devices 11. However, this is not a limitation, but it is also possible to use a rod integrator optical system formed of a light guide rod.

What is claimed is:

1. A light source cartridge comprising:
   a light source device unit comprising:
      a light source device including a light source having a light emitting tube and a reflector adapted to reflect a light beam emitted from the light emitting tube, and an outflow port constituting part adapted to house the light source and having a plurality of first outflow ports adapted to make a cooling air flow out toward the light emitting tube; and
      a flow channel constituting part including an inlet port constituting part having a plurality of first inlet ports communicated with the plurality of first outflow ports and adapted to introduce the cooling air, and an opening and closing part adapted to electively open and close the first inlet ports, and
   a cartridge case including a light source device housing part adapted to detachably house the light source device of the light source device unit, and an inlet port fixation part adapted to fix the inlet port constituting part of the light source device unit, and adapted to make the first inlet ports respectively communicate with the first outflow ports in a case in which the light source device is installed in the light source device housing part,
   wherein
      the first inlet ports are arranged in a periphery of a predetermined central axis,
      the opening and closing part includes a rotary member rotates around the central axis in accordance with a posture of the light source device to thereby selectively open and close the first inlet ports, and
      in the cartridge case, a plurality of the light source devices are mounted, and the inlet port constituting part is disposed corresponding to each of the light source devices.

2. The light source cartridge according to claim 1, wherein the rotary member rotates under weight of the rotary member to thereby selectively open and close the first inlet ports.

3. The light source cartridge according to claim 1, wherein the rotary member is formed to have a shape obtained by connecting the central axis and both ends of a circular arc centered on the central axis.

4. The light source cartridge according to claim 1, wherein a surface, against which the cooling air blows, of the rotary member is formed to have one of a shape perpendicular to the central axis and a shape tilted with respect to the central axis.

5. The light source cartridge according to claim 1, wherein the flow channel constituting part includes a second inlet port into which the cooling air is introduced in a direction roughly perpendicular to the central axis on an anterior side of a flow channel of the cooling air with respect to the rotary member, and
the outflow port constituting part of the light source device includes a second outflow port communicated with the second inlet port.

6. The light source cartridge according to claim 1, wherein the flow channel constituting part is configured without including the opening and closing part.

7. A projector comprising:
the light source cartridge according to claim 1;
a light modulation device adapted to modulate a light beam emitted from the light source cartridge in accordance with image information;
a projection optical device adapted to project the light beam modulated by the light modulation device; and
a cooling fan adapted to feed the cooling air toward the inlet port constituting part.

8. A projector comprising:
the light source cartridge according to claim 6;
a light modulation device adapted to modulate a light beam emitted from the light source cartridge in accordance with image information;
a projection optical device adapted to project the light beam modulated by the light modulation device; and
a cooling fan adapted to feed the cooling air toward the inlet port constituting part.

9. A projector comprising:
a first light source cartridge comprising:
    a first light source cartridge according to claim 1, and
a second light source cartridge comprising:
    a light source device including a light source having a light emitting tube and a reflector adapted to reflect a light beam emitted from the light emitting tube, and an outflow port constituting part adapted to house the light source and having a plurality of first outflow ports adapted to make a cooling air flow out toward the light emitting tube, and
    a flow channel constituting part including an inlet port constituting part having a plurality of first inlet ports communicated with the plurality of first outflow ports and adapted to introduce the cooling air, the first inlet ports being arranged in a periphery of a predetermined central axis,
a light modulation device adapted to modulate a light beam emitted from the light source cartridge in accordance with image information;
a projection optical device adapted to project the light beam modulated by the light modulation device; and
a cooling fan adapted to feed the cooling air toward the inlet port constituting part,
wherein either one or both of the first light source cartridge and the second light source cartridge is used in accordance with a mounting posture of the projector.

* * * * *